United States Patent
Crandall

(10) Patent No.: US 7,794,003 B2
(45) Date of Patent: Sep. 14, 2010

(54) MODULAR STORAGE SYSTEM

(75) Inventor: Bryan Patrick Crandall, Tecumseh, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 12/348,459

(22) Filed: Jan. 5, 2009

(65) Prior Publication Data

US 2010/0171334 A1 Jul. 8, 2010

(51) Int. Cl.
*B60R 9/055* (2006.01)
(52) U.S. Cl. .................... 296/37.6; 224/403
(58) Field of Classification Search ............ 296/26.07, 296/59, 156, 37.6, 37.14, 37.15, 37.1; 224/539, 224/542, 402, 403, 404
See application file for complete search history.

(56) References Cited

U.S. PATENT DOCUMENTS

| | | | | | |
|---|---|---|---|---|---|
| 2,784,027 | A | * | 3/1957 | Temp | 296/156 |
| 2,867,471 | A | * | 1/1959 | Coon, Jr. | 296/156 |
| 4,270,324 | A | * | 6/1981 | Schaefer | 52/285.4 |
| 4,573,731 | A | * | 3/1986 | Knaack et al. | 296/37.6 |
| 5,167,433 | A | * | 12/1992 | Ryan | 296/37.1 |
| 5,215,205 | A | * | 6/1993 | Behlman | 220/4.31 |
| 5,265,993 | A | | 11/1993 | Wayne | |
| 5,568,890 | A | | 10/1996 | Magee et al. | |
| 5,597,193 | A | * | 1/1997 | Conner | 296/37.6 |
| 5,657,916 | A | * | 8/1997 | Tackett | 224/404 |
| 5,667,115 | A | * | 9/1997 | Verhaeg | 224/275 |
| 5,964,492 | A | * | 10/1999 | Lyon | 296/37.6 |
| 5,979,725 | A | * | 11/1999 | Lehrman | 224/539 |
| 5,996,868 | A | * | 12/1999 | Paradis | 224/404 |
| D426,187 | S | * | 6/2000 | Shultz | D12/414.1 |
| 6,241,137 | B1 | * | 6/2001 | Corr | 224/542 |
| 6,516,948 | B1 | * | 2/2003 | Caballero | 206/373 |
| 6,629,714 | B2 | * | 10/2003 | Campbell | 296/37.6 |
| 6,641,013 | B2 | | 11/2003 | Dise | |
| 6,695,375 | B1 | * | 2/2004 | May | 296/37.6 |
| 6,763,985 | B1 | * | 7/2004 | Stephenson et al. | 224/403 |
| 6,883,851 | B2 | | 4/2005 | McClure et al. | |
| 7,172,258 | B2 | * | 2/2007 | Bisson et al. | 312/348.3 |
| 7,216,914 | B2 | | 5/2007 | Lovell | |
| 7,270,360 | B2 | | 9/2007 | Frasure et al. | |
| 7,419,203 | B2 | * | 9/2008 | Chandler et al. | 296/37.6 |
| 2007/0046056 | A1 | | 3/2007 | Delaney et al. | |
| 2008/0222797 | A1 | * | 9/2008 | Cook | 4/613 |

* cited by examiner

*Primary Examiner*—Patricia L Engle
*Assistant Examiner*—Pinel E Romain
(74) *Attorney, Agent, or Firm*—Gifford, Krass, Sprinkle, Anderson & Citkowski, P.C.

(57) ABSTRACT

A modular storage system for use with a utility vehicle is disclosed. The modular storage system can extend across the floor of the utility vehicle and have a central elongated bin that is located between two wheel wells and extends generally between a front wall and a rear door of a utility vehicle storage space. A side bin can be included and be located between the central elongated bin and one of the side walls of the storage space.

19 Claims, 3 Drawing Sheets

MODULAR STORAGE SYSTEM

FIELD OF THE INVENTION

The present invention is related to a modular storage system. In particular, the present invention is related to a modular storage system for a pickup truck and/or a utility vehicle.

BACKGROUND OF THE INVENTION

Motor vehicles having storage spaces behind passenger seating are known. For example, pickup trucks, vans, SUVs and other utility vehicles are known and used for carrying and/or storing cargo, tools, groceries, hunting equipment and the like. In an effort to increase the utility of the storage space of a motor vehicle, items such as nets, dividers, storage bins and the like have been used with the motor vehicle. For example, U.S. Pat. No. 5,568,890 discloses a vehicle storage cabinet that fits on the floor of a cargo compartment of a utility vehicle. The cabinet contains two sections that can fit around a wheel well extending up from the floor. However, the storage cabinet does not afford for strapping of heavy items on top of the cabinet for secure holding during transport. In addition, the individual compartments within the storage cabinet do not provide for small storage compartments where small items such hand tools, nails, screws and the like can be stored in an efficient manner.

U.S. Pat. No. 5,265,993 discloses a truck bed divider system for placement within the bed of a truck. However, the divider system does not provide for enclosed compartments that can be used to store tools, equipment and the like in a watertight environment. In addition, the truck bed divider system does not afford for the secure holding of an item such as a motorcycle, all-terrain vehicle, etc. on top of the divider system. As such, a versatile storage system for pickup truck beds and utility vehicles that provides a variety of sealed compartments and a useful load surface for various outdoor activities and cargo hauling would be desirable.

SUMMARY OF THE INVENTION

A modular storage system for use with a motor vehicle is disclosed. The motor vehicle can be a utility vehicle having a storage space with a floor, a front wall, a rear door and two spaced apart side walls extending from the front wall to the rear door. In addition, the floor has a first wheel well and a spaced apart second wheel well extending up from the floor to a predetermined wheel well height.

The modular storage system can extend across the floor of the utility vehicle and have a central elongated bin located between the two wheel wells and extend generally between the front wall and the rear door of the motor vehicle storage space. The elongated central bin can have an open side and a bottom wall that extends between a pair of side walls. The pair of side walls can be generally parallel and spaced apart from each other such that an elongated compartment is formed within the elongated central bin. Each of the pair of side walls of the central elongated bin can have at least one aperture and an inner surface with a plurality of vertical grooves. In addition, the side walls can have an outer surface with a first tongue-and-groove fitting. A central bin cover can be attached to the central elongated bin and be dimensioned to cover the open side, thereby providing a sealed compartment within the bin.

A side bin can be included between the central elongated bin and one of the side walls of the storage space. The side bin can also have an open side and a side wall with a second tongue-and-groove fitting such that the side bin can be attached to the central elongated bin by engagement of the first and second tongue-and-groove fittings. The side wall of the side bin can have an aperture that aligns with the at least one aperture on the side wall of the central elongated bin when the side bin is attached to the central elongated bin. A fastener can extend through aligned apertures of the side bin and central elongated bin side walls and thereby provide an additional attachment mechanism for securing the side bin to the central elongated bin. The side bin can also have a cover, the side bin cover dimensioned to cover the open side of the side bin and provide a sealed compartment therein.

The central elongated bin can have a first end wall and a second end wall, thereby affording the elongated compartment extending therebetween. A divider can be provided that fits at least partially within one of the plurality of vertical grooves in the side wall of the central elongated bin and thereby divide the elongated compartment into at least two compartments.

In some instances, a front pair of side bins and/or a rear pair of side bins can be provided. Each of the front pair of side bins can be located on opposite sides of the central elongated bin and in front or forwardly of the first and second wheel wells. The rear pair of side bins can also be located on opposite sides of the central elongated bin and rearwardly of the first and second wheel wells. Each of the side bins can have a second tongue-and-groove fitting with the side walls of the central elongated bin having complementary first tongue-and-groove fittings such that the side bins can be attached thereto by engagement of the first and second tongue-and-groove fittings. In addition, apertures can be provided within side walls of the side bins and the central elongated bin such that the side bins can be attached to the central elongated bin using a fastener extending through aligned apertures of the side walls.

The modular storage system can be strapped or bolted to the floor, front wall and/or side walls of the utility vehicle in order to provide a more secure load surface. Thus, in addition to a plurality of storage compartments, the modular storage system provides a useful load surface for various outdoor activities and cargo hauling. For example, tie down hooks can be provided as part of the modular storage system so that tie downs can be used to securely hold a motorcycle, all-terrain vehicle and the like on top of the modular storage system.

DETAILED DESCRIPTION OF THE INVENTION

Figure 1:
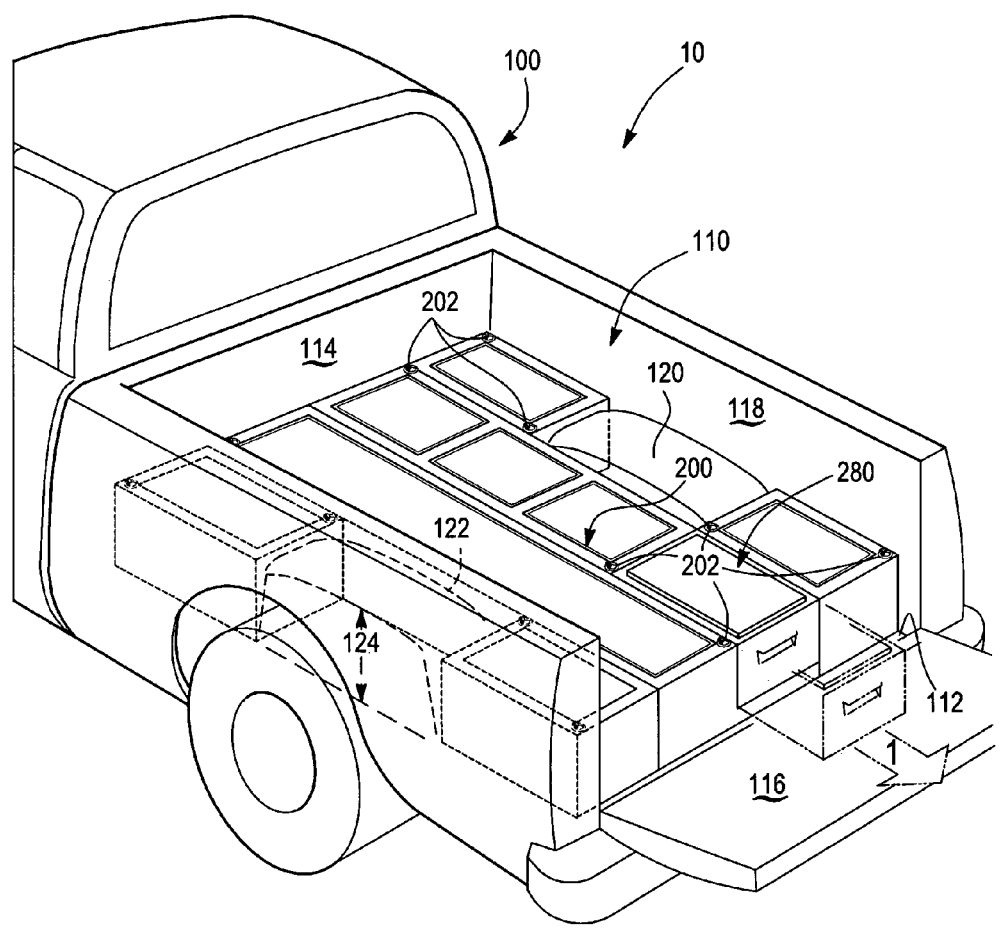
FIG. 1 is a perspective view of an embodiment of the present invention.

The present invention discloses a modular storage system for a utility vehicle. As such, the present invention has utility as a storage component for a motor vehicle.

The modular storage system can be included as part of a utility vehicle, the utility vehicle having a storage space. In some instances, the utility vehicle can be a pickup truck with a truck bed that serves as the storage space, or in the alternative the utility vehicle can be an SUV, van and the like that has a storage space behind passenger seating. The storage space can have a floor, a front wall, a rear door and two generally parallel and spaced apart side walls extending between the front wall and the rear door. The floor can also have a pair of spaced apart wheel wells that extend up from the floor to a predetermined wheel well height.

The modular storage system can extend across the floor of the utility vehicle and have a central elongated bin that is located between the pair of spaced apart wheel wells. In addition, the central elongated bin can extend generally between the front wall and the rear door of the storage space. The central elongated bin can have an open side and a bottom wall that extends between a pair of side walls, the pair of side walls being generally parallel and spaced apart from each other. In addition, the central elongated bin can have a first end wall and a second end wall with an elongated compartment extending therebetween.

The pair of side walls of the central elongated bin can have an inner surface with a plurality of vertical grooves and one or more apertures that extend traversely through the wall. The side walls can also each have an outer surface with a first tongue-and-groove fitting. A central bin cover can be included that can attach to the central elongated bin and be dimensioned to cover the open side of the bin. The central bin cover can be attached to the central elongated bin by a hinge snap fitting(s) and/or the like.

A side bin can be included, the side bin located between the central elongated bin and one of the side walls of the storage space. The side bin can have an open side and a side wall that has a complementary second tongue-and-groove fitting such that the second tongue-and-groove fitting can engage with the first tongue-and-groove fitting and afford for attachment of the side bin to the central elongated bin. Apertures can be present within the side walls of the central elongated bin and the side bin such that the apertures align with each other when the side bin is attached to the central elongated bin using the tongue-and-groove fittings. The apertures afford for a fastener such as a bolt and nut to be used to more securely attach the side bin to the central elongated bin. A side bin cover can be attached to the side bin and be dimensioned to cover the open side thereof. In some instances, the central elongated bin and the side bin with their respective covers have a height that is generally equal to the height of the wheel wells.

An inner surface of the central elongated bin and/or the side bin can have a plurality of vertical grooves such that a divider can be located within at least one of the vertical grooves and thereby produce at least two compartments within the central elongated bin and/or the side bin. It is appreciated that additional dividers can be added such that smaller compartments can be created within the central elongated bin and/or the side bin. It is appreciated that the elongated compartment of the central elongated bin can afford for storage of relatively long items such as pry bars, rifles, shotguns, fishing poles and/or other equipment used for recreation, work and the like.

In some instances, the central elongated bin can have a first column portion and a second column portion, the first and second column portions extending from the first end wall to the second end wall of the central elongated bin. The first column portion can contain the elongated compartment that extends from the first end wall to the second end wall, and the second column portion can have a plurality of bin compartments that are adjacent to the first column portion. In addition, one of the plurality of bin compartments of the second column portion can be a removable bin compartment and in some instances can be a removable thermally insulated bin compartment.

In other instances, the modular storage system can include a front pair of side bins and/or a rear pair of side bins. Each of the front pair of side bins can be located on opposite sides of the central elongated bin and in front or forwardly of the wheel wells. In addition, each of the rear pair of side bins can be located on opposite sides of the central elongated bin and rearwardly of the wheel wells. It is appreciated that each of these side bins can have a side wall with a second tongue-and-groove fitting that is complementary with the first tongue-and-groove fitting on the side walls of the central elongated bin. As such, each of the side bins can be attached to the central elongated bin by engaging the first and second tongue-and-groove fittings. In addition, the side walls of the central elongated bin and the side bins can have apertures that align with each other when a side bin is attached to the central elongated bin by engagement of the respective first and second tongue-and-groove fittings. Thereafter, a fastener can be placed within the aligned apertures and more securely attach the side bins to the central elongated bin. In this manner, a rigid and/or useful load surface is provided for various outdoor activities and cargo hauling.

The central elongated bin and/or one or more of the side bins can be attached to the floor, front wall and/or side walls of the utility vehicle and thereby provide a generally rigid load surface useful for various outdoor activities and/or cargo hauling. In the alternative, the modular storage system can not be attached to the utility vehicle and its weight and shape provide a generally rigid load surface useful for various outdoor activities and/or cargo hauling. In addition, tie down hooks or eyes can be attached to the modular storage system such that tie downs can be used to secure and/or strap an object on top thereof.

Turning now to FIG. 1, an embodiment of the modular storage system is shown generally at reference numeral 10. The modular storage system 10 can be used in combination with a utility vehicle 100, the utility vehicle 100 having a storage space 110. The storage space 110 can include a floor 112, a front wall 114, a rear door 116 and a pair of spaced apart side walls 118.

As shown in FIG. 1, the utility vehicle 100 is illustrated as a pickup truck. However, it is appreciated that the modular storage system 10 can be used with other utility vehicles that have a storage space behind a passenger seating compartment. The storage space 110 can also have a first wheel well 120 and a second wheel well 122. It is appreciated that the wheel wells 120 and 122 are a pair of wheel wells spaced apart from each other and each can have a predetermined height 124.

Attached to the modular storage system 10 can be one or more tie down hooks or eyes 202 that afford for a tie down strap, rope, cord and the like to be attached thereto. In addition, the modular storage system 10 can include a plurality of bins 200 with at least one of the bins 280 being removable by pulling the bin 280 in a first direction 1. The removable bin 280 can be a thermally insulated bin and thereby afford for a cooler to be included within the modular storage system 10.

Figure 2:
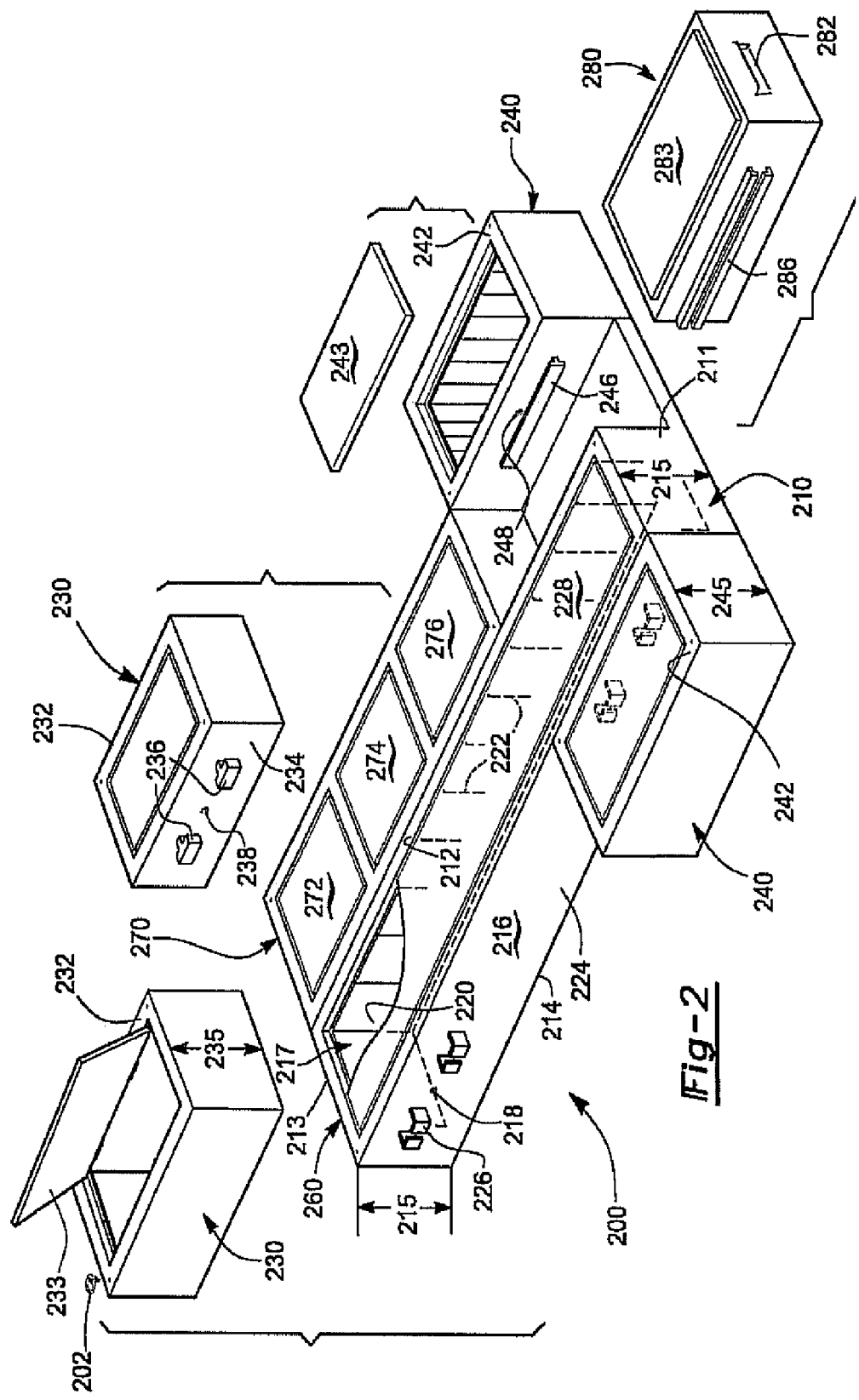
FIG. 2 is an exploded view of the modular storage system shown in FIG. 1.
Figure 3:
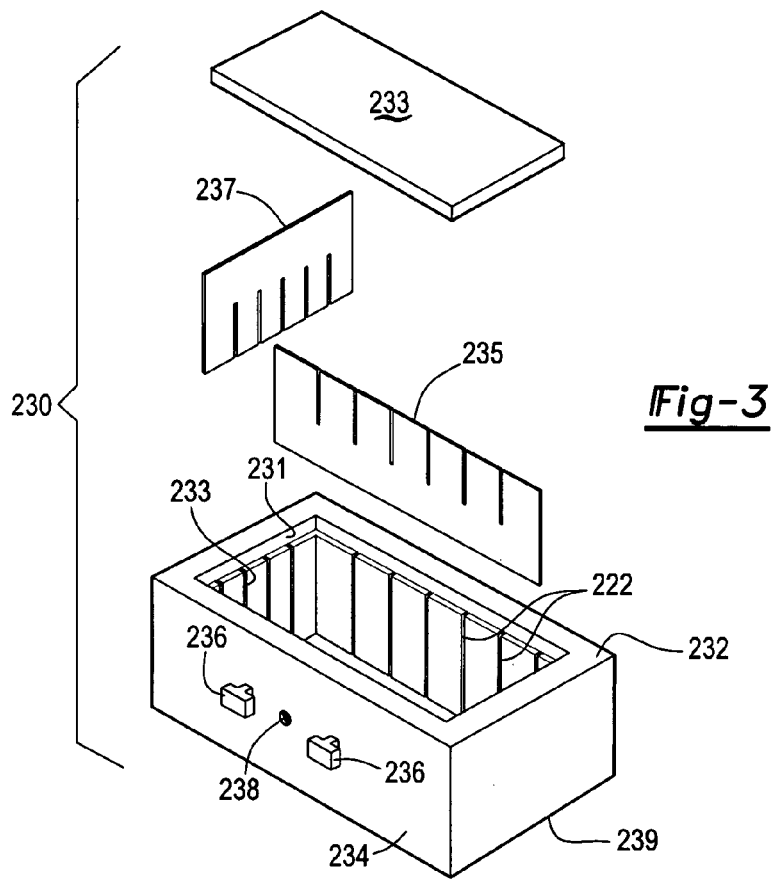
FIG. 3 is an exploded view of a side bin shown in FIG. 2.
Figure 4:
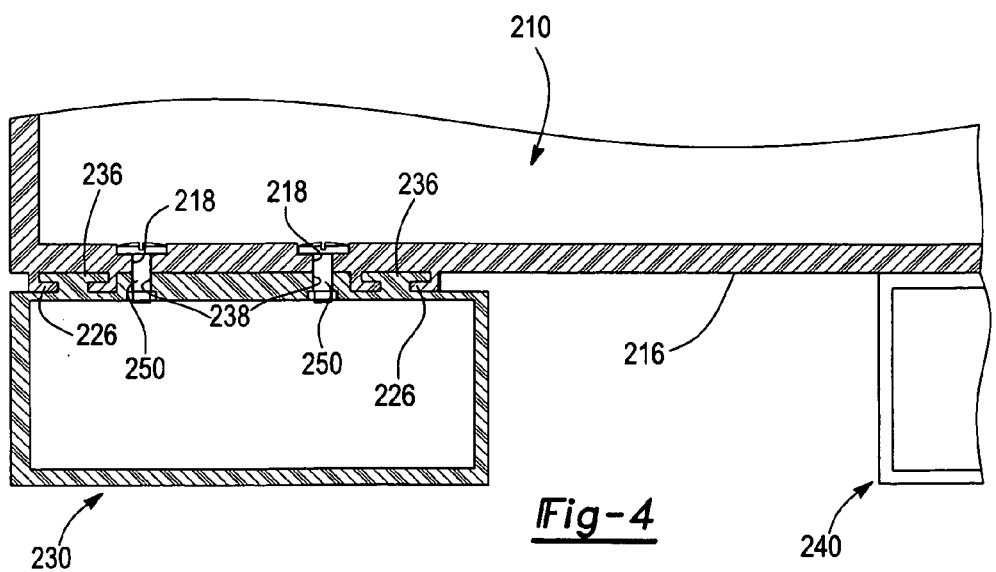
FIG. 4 is a top cross-sectional view of a side bin attached to a central elongated bin.

Turning now to FIGS. 2-4, exploded views of the modular storage system 10 are shown in FIGS. 2 and 3 and a top cross-sectional view of a portion of the modular storage system 10 is shown in FIG. 4. The modular storage system 10 with the plurality of bins 200 can include a central elongated bin 210 that can be located between the pair of spaced apart wheel wells 120 and 122 and extend generally from the front wall 114 to the rear door 116 of the storage space 110. The central elongated bin 210 can have an open side 212 and a bottom wall 214 that extend between a pair of side walls 216. The pair of side walls 216 can be generally parallel and spaced apart from each other. At least one of the side walls 216 can have an aperture 218 and an inner surface 220 with a plurality of vertical grooves 222. The side wall 216 can also have an outer surface 224 with a first tongue-and-groove fitting 226.

A central bin cover 228 can be included and afford a sealed compartment. The central bin cover 228 can be attached to the central elongated bin 210 and be dimensioned to cover the open side 212. In addition, the central elongated bin 210 can have a first end wall 211 and a second end wall 213 with an elongated compartment 217 extending from the first end wall 211 to the second end wall 213. In this manner, the central elongated bin 210 with the central bin cover 228 provides for the elongated compartment 217 that can store elongated objects used for hunting, fishing, recreation and/or work. In addition, a divider 237 (FIG. 3) can be inserted at least partially within one of the plurality of vertical grooves 222 and thereby afford for the elongated compartment 217 to be split into at least two compartments. It is appreciated that the central bin cover 228 can be attached to the central elongated bin 210 using one or more hinges (not shown), snap fittings (not shown) and the like such that access to the elongated compartment 217 from the top of the central elongated bin 210 is afforded.

A side bin 230 can also be included as part of the modular storage system 10. The side bin 230 can include an open side 232 and a side wall 234. The side wall 234 can include a second tongue-and-groove fitting 236 that is complementary to the tongue-and-groove fitting 226 on the side wall 216 of the central elongated bin 210. In addition, the side wall 234 of the side bin 230 can include an aperture 238. It is appreciated that the aperture 238 can align with the aperture 218 within the side wall 216 when the side bin 230 is attached to the central elongated bin 210 by engagement of the first and second tongue-and-groove fittings 226, 236. Thereafter, a fastener can be used to further secure the side bin 230 to the central elongated bin 210. For example and as shown in FIG. 4, the aperture 238 of the side bin 230 aligns with the aperture 218 of the central elongated bin 210 and an elongated fastener 250 is inserted therethrough and used to attach the side bin 230 to the central elongated bin 210. As illustrated in FIG. 4, more than one aperture 238 and/or 218 can be included such that multiple elongated fasteners 250 can be used to more securely attach the side bin 230 to the central elongated bin 210.

The side bin 230 can have a side bin cover 233 that attaches to the side bin and is dimensioned to cover the open side 232 and provide a sealed enclosure therewithin. Similar to the central bin cover 228, the side bin cover 233 can be attached to the side bin 230 using one or more hinges (not shown), a snap fitting (not shown), etc. In addition, the side bin 230 and a side bin 240 discussed below, can have an inner surface with a plurality of vertical grooves 222. The vertical grooves 222 afford for the divider 237 and/or a divider 235 to be inserted at least partially therein and provide smaller compartments from an original larger compartment.

In some instances, the central elongated bin 210 can include a first column portion 260 and a second column portion 270. The first column portion 260 can include the elongated compartment 217 while the second compartment 270 can include a plurality of compartment bins 272, 274 and 276. In addition, one of the compartment bins in the second column portion 270 can be removable as illustrated by the bin 280 in FIGS. 1 and 2. The compartment bin 280 can include a handle 282 that assists in pulling the bin 280 in a first direction 1 and thereby allow the bin 280 to be taken to a separate location than the modular storage system 10. For example and for illustrative purposes only, the compartment bin 280 can be a thermally insulated bin such that an ice box is provided that can be removed from the second column portion 270 and taken by hand to a separate location.

As shown in FIG. 2, the compartment bin 280 can have a tongue-and-groove fitting 286 that is complimentary with another tongue-and-groove fitting 246 that is attached to a sidewall of the central elongated bin 210. In addition, the compartment bin 280 can be prevented from being removed from the central bin 210 using a latch, pin, cotter-less hitch pin, bolt, screw and the like. In this manner, the compartment bin 280 can be removed from the central elongated bin 210 by first releasing and/or removing the latch, pin, etc., and pulling the bin 280 in the first direction 1.

In some instances, the plurality of bins 200 can include a front pair of side bins 230 and/or a rear pair of side bins 240 as shown in FIGS. 1 and 2. Each of the front pair of side bins 230 can be located on opposite sides of the central elongated bin 210 and in front or forwardly of the wheel wells 120 and 122. Likewise, each of the pair of rear side bins 240 can be located on opposite sides of the central elongated bin 210 and behind or rearwardly of the wheel wells 120 and 122. It is appreciated that each of the rear pair of side bins 240 can have an open side 242 and a cover 243 that can be attached to the side bin 240 and be dimensioned to cover the open side 242.

The central elongated bin 210, the front side bin 230 and the rear side bin 240 can have a height 215, 235 and 245, respectively, which is generally equal to the height 124 of the wheel wells 120 and 122. In this manner, the modular storage system 10 has a height that affords for objects to be stored on top thereof across the entire width of the storage space 110. In addition, the modular storage system 10 having the central elongated bin 210 with securely attached side bins 230 and/or 240 provides a useful load surface for various outdoor activities and cargo hauling.

It is appreciated that the modular storage system 10 can be used with new vehicles or with used vehicles. In addition, the modular storage system 10 and its components can be made from any material known to those skilled in the art, illustratively including metals, alloys, plastics, wood, ceramics and the like.

The foregoing drawings, discussion and description are illustrative of specific embodiments and/or examples of the present invention, but they are not meant to be limitations upon the practice thereof. Numerous modifications and variations of the invention will be readily apparent to those of skill in the art in view of the teaching presented herein. It is the following claims, including all equivalents, which define the scope of the invention.

I claim:

1. A modular storage system for use with a utility vehicle, the utility vehicle having a storage space with a floor, a front wall, a rear door and two parallel spaced apart side walls extending between the front wall and the rear door, the floor also having a first wheel well spaced apart from a second wheel well, the first wheel well and the second wheel well extending up from the floor to a predetermined wheel well height, said modular storage system comprising:

a plurality of compartment bins extending across the floor and having:

a central elongated bin located between the two wheel wells and extending generally between the front wall and the rear door of the storage space, said elongated central bin having an open side and a bottom wall extending between a pair of side walls, said pair of side walls generally parallel and spaced apart from each other;

said pair of side walls having at least one aperture and an inner surface with a plurality of vertical grooves, said pair of side walls also having an outer surface with a first tongue-and-groove fitting;

a central bin cover attached to said central elongated bin and dimensioned to cover said open side of said central elongated bin;

a side bin located between said central elongated bin and one of the two parallel spaced apart side walls of the storage space, said side bin having an open side and a side wall with a second tongue-and-groove fitting;

said second tongue-and-groove fitting engaged with said first tongue-and-groove fitting such that said side bin is attached to said central elongated bin;

said side wall of said side bin also having an aperture that aligns with said at least one aperture of said pair of side walls of said central elongated bin when said at least one side bin is attached to said central elongated bin;

a fastener extending through said aperture of said attachment wall and said at least one aperture of said side walls; and a side bin cover attached to said at least one side bin and dimensioned to cover said open side of said at least one side bin;

said central elongated bin with said central bin cover and said side bin with said side bin cover having a height that is generally equal to the wheel well height.

2. The motor vehicle with the modular storage system of claim 1, wherein said central elongated bin has a first end wall and a second end wall with an elongated compartment extending from said first end wall to said second end wall.

3. The motor vehicle with the modular storage system of claim 1, wherein said central bin cover is a hinged central bin cover, said hinged central bin cover operable to pivot between a closed position and an open position.

4. The motor vehicle with the modular storage system of claim 1, wherein said central bin cover is a snapped central bin cover, said snapped central bin cover operable to be removed from said central elongated bin.

5. The motor vehicle with the modular storage system of claim 2, further comprising a divider at least partially within one of said plurality of vertical grooves of said pair of side walls of said central elongated bin, said divider dimensioned to divide said elongated compartment into at least two compartments.

6. The motor vehicle with the modular storage system of claim 1, wherein said side bin is a first side bin located on one side of said elongated central bin and a second side bin located on an opposite side of said elongated central bin.

7. The motor vehicle with the modular storage system of claim 1, wherein said side bin is a first side bin located forwardly of the first wheel well and a second side bin located rearwardly of the second wheel well.

8. The motor vehicle with the modular storage system of claim 1, wherein said side bin is a front pair of side bins and a rear pair of side bins, each of said front pair of side bins located on opposite sides of said central elongated bin and forwardly of the first and second wheel wells and each of said rear pair of side bins located on opposite sides of said central elongated bin and rearwardly of the first and second wheel wells.

9. The motor vehicle with the modular storage system of claim 2, wherein said central elongated bin has a first column portion and a second column portion, said first and second column portions extending from said first end wall to said second end wall.

10. The motor vehicle with the modular storage system of claim 9, wherein said first column portion has said elongated compartment extending from said first end wall to said second end wall.

11. The motor vehicle with the modular storage system of claim 10, wherein said second column portion has a plurality of bin compartments adjacent to said first column portion.

12. The motor vehicle with the modular storage system of claim of claim 11, wherein one of said plurality of bin compartments is a thermally insulated bin compartment.

13. The motor vehicle with the modular storage system of claim 12, wherein said thermally insulated bin compartment is removably attached to said central elongated bin.

14. A motor vehicle with a modular storage system, said motor vehicle comprising:

a utility vehicle having a storage space with a floor, a front wall, a rear door and two parallel spaced apart side walls extending between said front wall and said rear door, said floor also having a first wheel well spaced apart from a second wheel well, said first wheel well and said second wheel well extending up from said floor to a predetermined wheel well height;

a modular storage system extending across said floor, said modular system having:

a central elongated bin located between said two wheel wells and extending generally between said front wall and said rear door of said storage space, said elongated bin having an open side and a bottom wall extending between a pair of side walls, said pair of side walls generally parallel and spaced apart from each other;

said pair of side walls each having at least four apertures and an inner surface with a plurality of vertical grooves, said pair of side walls also each having an outer surface with at least two spaced apart first-half tongue-and-groove fittings;

a central bin cover attached to said central elongated bin and dimensioned to cover said open side of said central elongated bin;

a front pair of side bins and a rear pair of side bins, each of said front pair of side bins located on opposite sides of said central elongated bin and forwardly of said first and second wheel wells and each of said rear pair of side bins located on opposite sides of said central elongated bin and rearwardly of said first and second wheel wells;

said side bins each having an open side and a side wall with a second-half tongue-and-groove fitting;

said second-half tongue-and-groove fitting on said side wall of each side bin engaged with one of said four first-half of said tongue-and-groove fittings, said side bins attached to said central elongated bin;

each of said side walls of said side bins also having an aperture that aligns with one of said four apertures of said pair of side walls of said central elongated bin when each of said side bins is attached to said central elongated bin;

a pin extending through each of said side wall apertures and said elongated central bin apertures; and a side bin cover attached to each of said side bins;

said central elongated bin with said central bin cover and said side bins with said side bin covers having each having a height that is generally equal to said wheel well height.

15. The motor vehicle with the modular storage system of claim 14, wherein said central elongated bin has a first end wall and a second end wall with an elongated compartment extending from said first end wall to said second end wall.

16. The motor vehicle with the modular storage system of claim 14, wherein said central elongated bin has a first column portion and a second column portion, said first and second column portions extending from said first end wall to said second end wall.

17. The motor vehicle with the modular storage system of claim 16, wherein said first column portion has said elongated compartment extending from said first end wall to said second end wall.

18. The motor vehicle with the modular storage system of claim 16, wherein said second column portion has a plurality of bin compartments adjacent to said first column portion.

19. The motor vehicle with the modular storage system of claim of claim 18, wherein one of said plurality of bin compartments is a removable thermally insulated bin compartment.

* * * * *